United States Patent [19]

Gewanter et al.

[11] Patent Number: 5,114,618

[45] Date of Patent: May 19, 1992

[54] OXYGEN REMOVAL WITH KETO-GLUCONATES

[75] Inventors: Herman L. Gewanter, Waterford; Ralph D. May, Oakdale, both of Conn.

[73] Assignee: Pfizer Inc., New York, N.Y.

[21] Appl. No.: 595,530

[22] Filed: Oct. 11, 1990

[51] Int. Cl.$^5$ .............................................. C23F 11/10
[52] U.S. Cl. ........................... 252/389.53; 252/389.62; 252/188.28; 252/392
[58] Field of Search .................. 252/389.62, 392, 396, 252/390, 188.28, 400.62, 401, 403, 407, 389.53

[56] References Cited

U.S. PATENT DOCUMENTS

| | | | |
|---|---|---|---|
| 2,926,174 | 2/1960 | Linn | 252/396 |
| 2,938,911 | 5/1960 | Linn | 252/396 |
| 3,454,501 | 7/1969 | Ziffer et al. | 252/407 |
| 4,067,690 | 1/1978 | Cuisia et al. | 21/27 R |
| 4,278,635 | 7/1981 | Kerst | 422/14 |
| 4,279,767 | 7/1981 | Muccitelli | 252/178 |
| 4,289,645 | 9/1981 | Muccitelli | 252/178 |
| 4,350,606 | 9/1982 | Cuisia et al. | 252/392 |
| 4,419,237 | 12/1983 | Kelly et al. | 422/17 |
| 4,524,015 | 6/1985 | Takahashi et al. | 252/188.28 |
| 4,627,921 | 12/1986 | Meyers et al. | 210/668 |
| 4,681,737 | 7/1987 | Walker et al. | 252/389.62 |
| 4,851,130 | 7/1989 | May | 210/750 |
| 4,891,141 | 1/1990 | Christensen et al. | 252/188.28 |
| 4,975,219 | 12/1990 | Sato et al. | 252/389.62 |

Primary Examiner—Deborah L. Kyle
Assistant Examiner—Valerie Fee
Attorney, Agent, or Firm—Peter C. Richardson; Paul H. Ginsburg; Robert F. Sheyka

[57] ABSTRACT

There is disclosed a composition and method for removing dissolved oxygen from aqueous systems, for example, boiler water systems or oil injection water or brine. The disclosed method and composition uses a salt of a keto-gluconic acid, or a salt of a stereoisomer of a keto-gluconic acid, as the oxygen scavenger.

9 Claims, No Drawings

OXYGEN REMOVAL WITH KETO-GLUCONATES

BACKGROUND OF THE INVENTION

The present invention relates to the inhibition of corrosion of metal surfaces in contact with an aqueous system by the use of an oxygen scavenger which, reduces the oxygen content of the system.

In aqueous systems, the presence of dissolved gases such as oxygen and carbon dioxide can cause severe corrosion of metal surfaces in contact with the aqueous system. Such corrosion is likely to be observed in boilers, heat exchangers and injection means for use in oil wells. Oxygen causes pitting of the metal surfaces. While such corrosion may affect only a small area of the metal surface, it is usually concentrated and may cause either metal failure or result in the corrosion products blocking the lines of the system.

For example, in boiler systems, corrosion due to the presence of oxygen may occur in feed lines, the boiler, steam lines, and steam condensate return lines as well as other parts of the system. Dissolved carbon dioxide also contributes to corrosion of steam and steam condensate lines.

In order to inhibit corrosion due to oxygen and carbon dioxide, boiler systems have traditionally been treated with oxygen scavengers and neutralizing amines which, respectively, either react with oxygen or neutralize carbon dioxide. Such oxygen scavengers are referred to in a number of patents.

U.S. Pat. No. 4,067,690 refers to the use of hydroxylamines combined with well known catalysts, e.g., alkali metal hydroxides, as oxygen scavengers.

U.S. Pat. No. 4,278,635 refers to the use of hydroquinone and dihydroxy, diamino and aminohydroxybenzenes and their lower alkyl substituted derivatives as boiler water oxygen scavengers.

U.S. Pat. No. 4,350,606 refers to the use of a hydroxylamine compound and a volatile, neutralizing amine such as cyclohexylamines, morpholine, etc. for preventing corrosion in boiler water systems.

U.S. Pat. Nos. 4,279,767 and 4,289,645 refer to the use of a hydrogen-free solution of hydroquinone and certain neutralizing amines such as methoxypropylamine and diethylaminoethanol as an oxygen scavenger for boiler water and other aqueous media.

U.S. Pat. No. 4,419,327 refers to the use of amine-neutralized erythorbic acid as an oxygen remover or scavenger in boiler feedwater.

U.S. Pat. No. 4,627,921 refers to a method for deoxygenation of water at ambient temperature by adding to the water a reducing agent such as hydrazine, morpholine, sodium sulfite or sodium acid sulfite and passing the resultant solution through an absorbent bed which may be made of activated carbon.

U.S. Pat. No. 4,851,130 refers to a method for removing dissolved oxygen from an aqueous oxygen-containing system by contacting said system with erythorbic acid, erythorbate, ascorbic acid, ascorbate and with activated carbon.

SUMMARY OF THE INVENTION

In one embodiment, the present invention is directed to a composition for the removal of dissolved oxygen from an aqueous system, said aqueous system at a temperature of from about 65° C. to about 175° C., said composition comprising an oxygen-scavenging effective amount of an oxygen scavenger selected from the group consisting of an alkali metal salt or an amine salt of a keto-gluconic acid, an alkali metal salt or amine salt of a stereoisomer of said keto-gluconic acid, or a $C_1$–$C_4$ alkyl ester of said keto-gluconic acid or said stereoisomer, said composition also having a pH of above 7.0.

Preferred pH's for the composition are from about 8.0 to about 11.

Preferred alkali metal salts of the keto-gluconic acid are the sodium and potassium salts.

Preferred salts of the keto-gluconic acid are the keto-D-gluconates. Preferred salts of the stereoisomers are salts of keto-gulonic acid or the the keto-gulonates.

Preferred amine salts are the ammonium, triethanolamine, morpholine, diethylaminoethanol, and cyclohexylamine salts.

Preferred also is the composition where the pH is about 9.0.

Preferred also is the composition where a suitable metal ion, for example, copper is added.

Preferred aqueous systems are feedwaters for boilers and oil well injection water or brine.

In another embodiment, the present invention is directed to a process for the removal of dissolved oxygen from an aqueous system, said aqueous system at a pH of above 7 and at a temperature of from about 65° C. to about 175° C., comprising adding to said aqueous system an oxygen- scavenging effective amount of an oxygen scavenger selected from the group consisting of an alkali metal salt or amine salt of a ketogluconic acid, an alkali metal salt or amine salt of a stereoisomer of said keto-gluconic acid, and $C_1$–$C_4$ alkyl esters of said salts of said keto-gluconic acid, or stereoisomers thereof.

Preferred is the process wherein said alkali metal salt is the sodium or potassium salt.

Preferred amine salts are the ammonium, triethanolamine morpholine, diethylaminoethanol and cyclohexylamine salts.

Preferred stereoisomers for use in the process are the salts of gulonic acid, or the keto-gulonates.

Preferred is the process where the pH of the system is from about 8 to about 11.

Preferred also is the process wherein the pH of the aqueous system is about 9.0.

Preferred also is the process wherein a suitable metal ion, for example, copper, is added to the aqueous system.

DETAILED DESCRIPTION OF THE INVENTION

The amount of oxygen scavenger needed for oxygen removal from an aqueous system depends on parameters such as the amount of oxygen present in the aqueous system and the type of scavenger used. In general, the amount of oxygen scavenger ranges from about 10 to about 15 parts per part of oxygen in the system.

The present oxygen scavengers are effective in aqueous systems having temperatures ranging from about 65° C. (149° F.) to about 175° C. (350° F.). Thus, the oxygen scavenger may be used in boiler water feedwater systems and in oil injection water or brine at these temperatures.

The present oxygen scavengers are effective at alkaline pH's, i.e., above 7 and from about 8 to about 11. Thus, they are effective in boiler feedwater systems, and in oil injection water or brines at this pH.

Compositions containing the oxygen scavenger, if preformulated, may be rendered, alkaline by the addition of a suitable pH adjusting agent, e.g. sodium hydroxide.

As oxygen scavengers, the composition and process of the present invention uses the described salts of either keto-gluconic acid or keto-gulonic acid. These salts will hereinafter be referred to as either keto-gluconates or ketogulonates.

One class of the present oxygen scavengers are the alkali metal salts of keto-gluconates, and stereoisomers thereof. Both the D and L forms and the DL forms of the keto-gluconates may be used. Stereoisomers of the ketogluconates include the keto-gulonates, which may also be used in the D, L, or DL forms.

Preferred alkali metal salts are the sodium and potassium salts. The sodium and potassium salts of the keto-D-gluconates, keto-L-gluconates and the keto-DL-gluconates may be used in both the composition and process of the present invention. Similarly, the sodium and potassium salts of the keto-D-gulonates, keto-L-gulonates and keto-DL-gulonates may be used.

Preferred amine salts are the ammonium salts, the triethanolamine salts, the diethylaminoethyl, cyclohexylamine and the morpholine salts of the keto-gluconates and ketogulonates.

Preferred esters of the keto-gluconates and stereoisomers thereof are the $C_1$–$C_4$ alkyl esters. Preferred is the methyl ester.

If desired, a metal salt may also be added to the composition or process of the present invention. The presence of the metal salts, if added, decreases the reaction time. If added, the metal salt is in a water soluble form. Preferred metal salts are copper (II) sulfate, copper (I) sulfate, cobalt (II) sulfate, ferric (III) sulfate, nickel (II) sulfate, manganese (II) sulfate, and ferrous (II) sulfate, and combinations thereof.

Having described the invention in general terms, reference is now made to specific examples. It is to be understood that these examples are not meant to limit the present invention, the scope of which is determined by the claims.

Sodium 2-keto-gluconate does not act as an oxygen scavenger at ambient conditions. In a solution at a concentration of 500 ppm @ pH 6.7 and a temperature of 30° C., sodium 2-ketogluconate did not react with oxygen. The several examples which follow show a dramatic contrast to this behavior when 2-ketogluconate is activated.

EXAMPLE 1

Temperature plays an important role in the activation of 2-ketogluconate as shown by this example. For this series of experiments, 500 ppm of sodium 2-ketogluconate was added to an aqueous solution containing dissolved oxygen at pH 9.0.

| Temperature | Oxygen Removal |
|---|---|
| 30° C. | <10% in 1 Hr. |
| 50° C. | 30% in 1 Hr. |
| 65° C. | 95% in 30 Min. |
| 85° C. | 99% in 2 Min. |

EXAMPLE 2

Alkaline pH activates 2-ketogluconate as shown by this example. For this series of experiments, 500 ppm of sodium 2-ketogluconate was added to an aqueous solution containing dissolved oxygen at a temperature of 65° C.

| pH | Oxygen Removal |
|---|---|
| 6.7 | 50% in 1 Hr. |
| 8.0 | 98% in 20 Min. |
| 9.0 | 99% in 20 Min. |
| 10.0 | 99% in 20 Min. |

EXAMPLE 3

Various metal ions catalyze the reaction between 2-ketogluconate and oxygen. For this series of experiments, 500 ppm of sodium 2-ketogluconate was added to an aqueous solution containing dissolved oxygen and 10 ppm of a metal ion at a temperature of 65° C. and pH of 9.0.

| Metal Ion | Oxygen Removal |
|---|---|
| None | 97.5% in 1 Hr |
| Copper | 99.99% in 3.5 Min. |
| Cobalt | 99.99% in 10 Min. |
| Nickel | 99.97% in 10 Min. |
| Manganese | 99.99% in 15 Min. |
| Iron | 99.99% in 15 Min. |

EXAMPLE 4

Oxygen scavenging is not unique to the sodium salt of 2-ketogluconate. For this example, 500 ppm of different 2-ketogluconate salts were added to an aqueous solution containing dissolved oxygen at a temperature of 85° C. and a pH of 9.0.

| Counter Ion | Oxygen Removal |
|---|---|
| Potassium | 95% in 10 minutes |
| Ammonium | |

EXAMPLE 5

The isomer of 2-ketogluconate, 2-ketogulonate shows similar oxygen scavenging behavior. 500 ppm sodium 2-ketogulonate added to an aqueous solution containing dissolved oxygen at a temperature of 85° C. and a pH of 9.0, achieved 95% oxygen removal in 28 min.

EXAMPLE 6

The methyl ester of 2-ketogluconate exhibits oxygen scavenging behavior over a wide pH range. For this series of experiments, 500 ppm of methyl-2-ketogluconate was added to an aqueous solution containing dissolved oxygen at a temperature of 85° C.

| pH | Oxygen Removal |
|---|---|
| 3 | 97% in 10 Min. |
| 7 | 95% in 6 Min. |
| 9 | 96% in 6 Min. |

We claim:
1. A composition for the inhibition of corrosion due to the presence of oxygen in aqueous systems, said aqueous system having a temperature of from about 65° C. to about 175° C., said composition comprising an oxygen scavenging effective amount of an oxygen scavenger selected from the group consisting of alkali metal salts and amine salts of keto-gluconic acid, alkali metal salts and amine salts of stereoisomers thereof, and $C_1$–$C_4$ alkyl esters of said salts of keto-gluconic acid, and stereoisomers thereof, said composition also having a pH of above 7.

2. The composition of claim 1 wherein said temperature of said aqueous system is about 105° C.

3. The composition of claim 1 wherein said pH is from about 8.0 to about 11.

4. The composition of claim 3 wherein said pH is about 9.

5. The composition of claim 1 wherein said aqueous system is feedwater for a boiler.

6. A composition according to claim 1 further comprising the addition of a metal ion.

7. A composition according to claim 6 wherein said metal ion is selected from the group consisting of copper, iron, cobalt, nickel and manganese, and combinations thereof.

8. A composition according to claim 1 wherein said salt of keto-gluconic acid is sodium 2-ketogluconate.

9. A composition according to claim 1 wherein said salt of said stereoisomer is sodium 2-ketogulonate.

* * * * *